Sept. 18, 1934.  J. L. H. HAND  1,973,808
MAGNETIC COMPASS CORRECTIVE DEVICE
Original Filed May 31, 1929
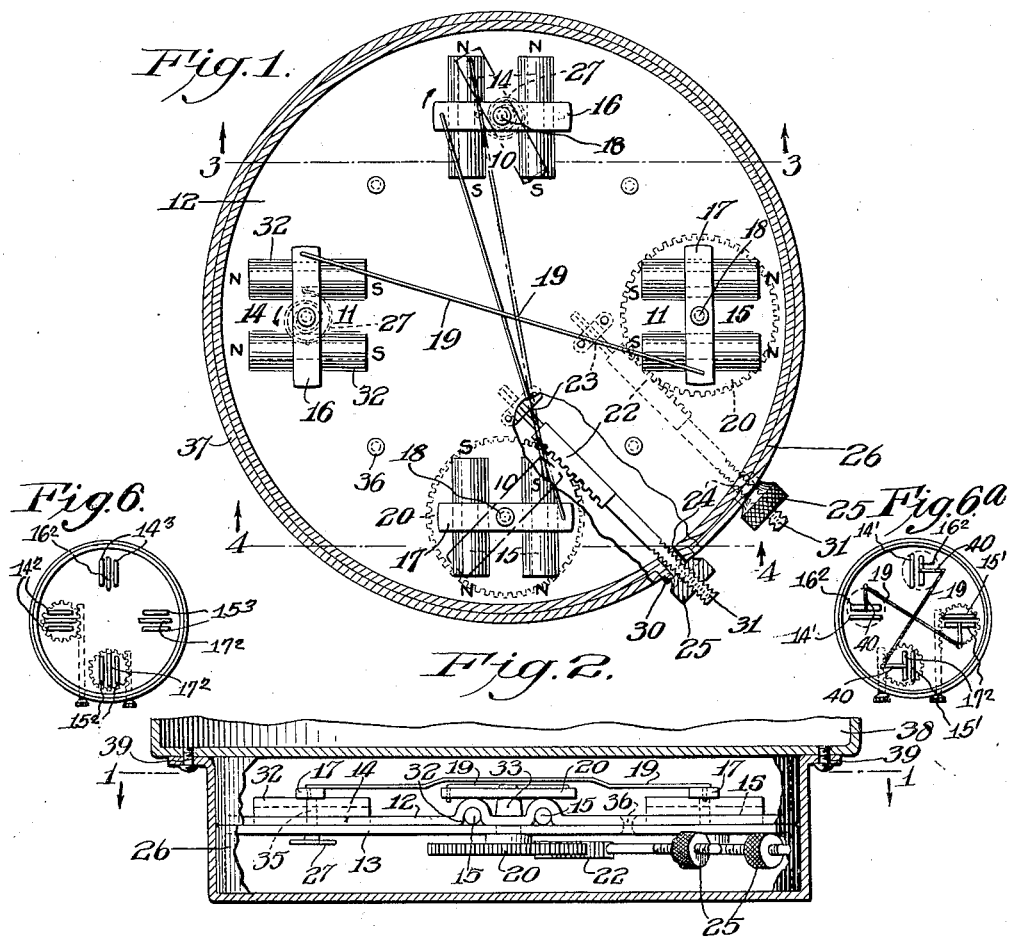
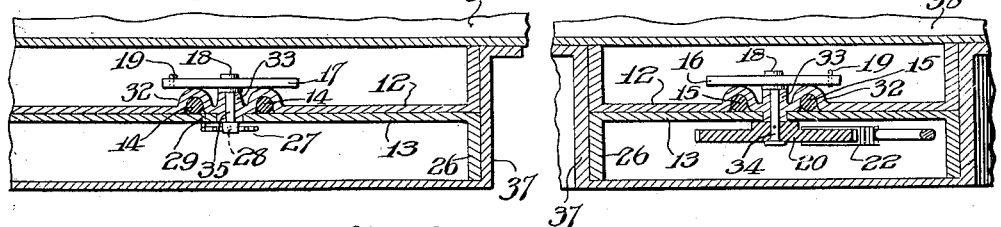
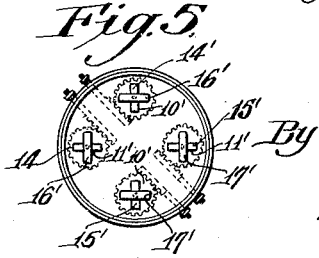
Witnesses:
Inventor
John L. H. Hand,
By
Attorney.

Patented Sept. 18, 1934

1,973,808

UNITED STATES PATENT OFFICE 1,973,808

MAGNETIC COMPASS CORRECTIVE DEVICE

John L. H. Hand, Bala-Cynwyd, Pa.

Application May 31, 1929, Serial No. 367,212
Renewed June 29, 1933

11 Claims. (Cl. 33—225)

My invention relates to a device for correcting the field of the carrier of a compass so that the compass will indicate correctly irrespective of variation in the direction of alinement of its carrier.

A purpose of my invention is to provide novel means for easily neutralizing the magnetic field of the carrier of a compass at the compass, the compass being fixed to the carrier which may be a ship, an aircraft or a vehicle.

A further purpose is to adjust the field at a compass from opposing and alining magnets by means of an angular adjustment of an armature of one of the magnets or by means of angular adjustments of the armatures of both of the magnets, either or both according to circumstance.

A further purpose is to adjust the magnetic effect upon a compass of alined, stationary and opposing magnets by relatively reverse angular adjustments of armature members at the respective magnets.

A further purpose is to mount two relatively perpendicular sets of stationary opposing magnets substantially symmetrical with respect to an axis through a compass, and to adjust the magnetic effects thereof at the compass by means of reversely, angularly adjustable armature members. I preferably make each set of magnets comprise two alined, opposing and equal pairs of magnets, and pivotally mount an armature member across and angularly adjustable with respect to each pair, providing connections whereby each adjustment of an armature of one of the pairs is accompanied by a corresponding reverse adjustment of the armature of the other pair of the set.

Whether a single magnet or a magnet pair be used at each of the four positions shown, and whether the magnet or magnets be varied in strength directly at two positions only or at all four positions, a further purpose is to neutralize the strength of the magnet or magnets initially by use of an armature which generally parallels the magnet length and to vary the magnet strength by turning the armatures to positions of varying angularity to the magnet lengths.

Further purposes will appear in the specification and in the claims.

I have elected to show one main form only of my invention, showing however a minor modification and have selected a main form and modification that are practical and efficient in operation and which well illustrate the principles involved.

Figure 1 is a section taken upon line 1—1 of Figure 2.

Figure 2 is a broken front elevation of the structure shown in Figure 1, a cover of the corrective device being shown.

Figures 3 and 4 are sections of Figure 1 taken upon the lines 3—3 and 4—4 thereof.

Figures 5, 6 and 6a are views generally similar to Figure 1 but showing somewhat different forms.

Like numerals refer to like parts in all figures.

Describing in illustration and not in limitation and referring to the drawing:—

Magnetic compasses aboard ship and air craft or the like give indications in accord with the direction of the magnetic field at the compass, which is the resultant of the earth's magnetic field and a magnetic field due to magnetic material in the carrier.

The field due to the magnetic material in the carrier is directionally variant according to variations in the angular alinement of the carrier with respect to the magnetic meridian and must, therefore, be neutralized at the compass to avoid errors in the readings of the compass that will be variant with the changes in directional alinements of the carrier.

The usual way of neutralizing the magnetic field of a carrier at the compass is to neutralize the east and west component of the field of the carrier by magnetic adjustments until the compass reads right when the carrier alinement is in one direction and then to change the alinement of the carrier ninety degrees and to neutralize the new east and west component of the carrier field by other magnetic adjustments until the compass again reads right.

Each neutralization of the east and west component of the carrier field involves an adjustment bringing the magnetic field at the compass in accord with the magnetic meridian so that the compass reads correctly, and the two adjustments must be on different magnetic sets that are magnetically independent of one another.

If the sets are not magnetically independent the operations must be repeated until the compass reads substantially right irrespective of the carrier alinement, as indicated by its reading right for two relatively perpendicular alinements.

My invention is directed toward providing an effective and convenient device for operating in this same general way, and in which the two magnetic adjustment sets are relatively independent to a high degree.

I mount two sets of magnetic adjusters 10 and 11 respectively, between non-magnetic metal sheets 12 and 13.

Each adjuster set comprises a fixed magnet member 14 alined with a similarly fixed and substantially equivalent magnet member 15 and cooperating armature members 16 and 17 one for each magnet member, the magnet members of the two sets being in relatively perpendicular alinements. Though obviously magnets can be used as armatures, the most satisfactory armatures are made of magnetically permeable material—for example soft iron—which is not magnetized except as it receives magnetic induction from the magnets with which it cooperates.

I preferably make each magnet member comprise two magnets side by side and on opposite sides of the pivot of the armature as illustrated in Figures 1 to 4 but optionally may make each magnet member include a single magnet as shown in Figure 5.

In Figures 1 to 4 the magnet members comprise a pair of magnets 14 and a pair of magnets 15 alined with the pair 14.

The armatures are pivotally mounted at 18 midway between the magnets of their respective pairs and extend transversely across the pairs of magnets in angularly variant positions.

They are operatively connected together by a suitable link 19 to move equal angular distances in angularly reverse directions.

The angular adjustment of the armatures may be obtained by any one of many different arrangements. In the illustration one of the armatures of each set, 17 carries a toothed sector 20 which meshes with a slidable rack member 22.

The rack member 22 is slidably mounted in bearings 23 and 24 and is provided with an adjustment nut 25 outside of a flange portion 26 of one of the discs.

The armature 16 mounted across the other pair of magnets is spring-pressed in the direction of the arrow by a spiral spring 27 of the magnetic material.

One end of this spring is connected at 28 to the armature and the other at 29 is anchored to the supporting disc.

This arrangement avoids any lost motion as the spring tends to rotate the members in the direction of the arrows and this rotation is stopped by the engagement between the nut 25 and the outer edges of its supporting bearing 30.

Desirably the upper portion of each of the rack members may be provided with a scale 31, to indicate the settings of the armatures by the scale readings at the outside surface of the respective nuts. The disc member 12 is depressed or grooved at 32 to receive the magnets, and carries a bearing 33 intermediate each pair of magnets for a pivot 34 or 35 carrying one of the armature members 16 or 17.

The bearings 33 extend through openings in the disc 13, and the pivot members 34 and 35 rigidly carry the armatures 16 and 17 respectively at their upper ends and at their lower ends respectively carry one of the toothed sections 20 and connection with one of the spiral springs 27.

The disc members are flanged in the direction of their common axis at 26.

The discs are held together by suitable screws 36 and a cover plate 37 slotted to pass the nuts fastens the device to the bottom or top portion of a compass member 38 by screws 39.

The effect of angular adjustment of the armatures of each set is to change the magnetic field from the magnets at the compass, the effect being a progressive one having a magnitude dependent upon the extent of the angular deflection of the armatures from their transverse position.

When the armatures are squarely across the magnets as indicated in full line position (Figure 1) the opposing pairs of magnets substantially neutralize one another and are without any substantial effect upon the field at the compass.

As the armature members are moved toward the position shown in dot and dash, the magnetic effect of the set of magnets becomes gradually material, progressively increasing, and the progressively increasing effect does not appear to be materially influenced by, or to itself materially affect any magnetic field of the other set, the two sets thus being highly independent of one another, which is an essential condition for effective and easy correction of the field at the compass.

In Figure 5 I show the armature members individually adjustable. Normally the armatures 17' are initially set at right angles to their magnets 15' and the armatures 16' then adjusted and set to a position such that the opposing alined magnets 14' and 15' substantially neutralize one another at the compass. When subsequently adjusting the field from either set at the compass only one of the armatures of the set need be adjusted, normally the armature 17' of either pair.

I prefer to adjust both armatures of one set simultaneously in reverse directions as illustrated in Figure 1 in that the field at the compass from either set of alined opposing magnets is then most perfectly unaffected by the adjustment of the other set, but optionally may adjust only one of these armatures, as illustrated in Figure 5.

The operation is generally similar to that of the prior art, the carrier being alined north and south and one of the sets being adjusted by screwing the nut 25 until the compass reads correctly.

The carrier is then alined east and west and corresponding adjustment is made at the other nut until the compass again reads correctly after which the field of the carrier at the compass should be substantially neutral and the compass read correctly irrespective of variation in direction of alinement of the carrier.

In order to show that the armature used need not be normally tranverse to the lengths of the magnets I have shown the armatures $16^2$, $17^2$, in Figures 6 and 6a, as parallel with the lengths of the single magnets 14', 15', or with the lengths of the pairs of magnets $14^3$, $15^3$.

Though I prefer to adjust the magnetic field directly at each of the four positions as provided for, for example, by means of the coupling of opposite armatures through the connections 19, because by this means I get the double strength due to the change of magnetic flux at opposite sides of the center, I recognize that one of these opposite magnets, or pairs of magnets, if adjusted will tend to correct the field to the extent of its strength even though the other magnet or pair of magnets across the center be not directly corrected; and that the correction of one magnet, or pair of magnets, on one side of the center, even though the opposite magnet or pair be not corrected, will react upon this opposite magnet or pair to produce a change in it.

In order to illustrate this I have shown correction or modification of the magnetic strength in two positions only of the four, providing for correction of the fixed pair of magnets 14² and 15² by movable armatures 17² but not providing for correction of the magnets 14³, 15³ whose armatures 16² and 17² are fixed in such position as to permit the system to be adjusted to a zero condition of external field.

The same form of adjustment is shown conventionally in this figure and in Figure 6a as in Figure 5.

In Figure 6a a single magnet only is used in each of the four positions and each of the four armatures is made adjustable from two adjustment positions parallel to the magnets by connections 19 corresponding generally to the construction in Figure 1. There is one difference, however, in that the positions of the two armatures make it desirable to turn them through outriggers 40 of any suitable material.

The operation of the structure in Figures 6 and 6a is substantially the same as that in the other figures.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. A corrective set comprising two stationary alined opposing magnets, an armature pivotally mounted at each magnet and means for simultaneously and reversely adjusting the angular positions of the armatures with respect to the magnets.

2. A corrective set for neutralizing the magnetic field of a compass at the compass, which comprises two stationary aligned opposing magnets on opposite sides angularly of the compass axis, an armature pivotally mounted at each magnet, two stationary aligned opposing magnets also on opposite sides angularly of the compass axis and located in positions 90° distant respectively from the other magnets so that the four magnets occupy positions 90° apart about the axis, armatures mounted at the respective magnets, one for each magnet, means for simultaneously adjusting the angular positions of the armatures for the first magnets and means for simultaneously adjusting the angular positions of the armatures of the second magnets with respect to the magnets.

3. A corrective device comprising stationary alined and opposing pairs of magnets, two pivotally mounted armatures, one mounted at each pair, and connections for making relatively reverse angular adjustments in the positions of the armatures with respect to their adjacent magnets in order to vary the magnetic effect from the two pairs at a point distant from the pairs.

4. A mounting and two relatively perpendicular magnetic corrective sets thereon, each set comprising two stationary opposing and alined pairs of magnets, two armatures pivotally mounted between the respective magnets of each pair and connections for giving an angular adjustment of one armature with a corresponding reverse angular adjustment of the other, said angular adjustments being with respect to the respectively adjacent pairs of magnets.

5. A corrective set comprising two stationary alined opposing magnets, an armature pivotally mounted at each magnet and means for adjusting the angular position of one of the armatures with respect to its adjacent magnet.

6. A corrective set comprising two stationary alined opposing magnets, two other stationary alined opposing magnets having an alinement substantially perpendicular to the alinement of the first magnets, an armature pivotally mounted at each of the magnets, means for adjusting the angular positions of the armatures adjacent the first two magnets with respect to the adjacent magnets and other means for adjusting the angular positions of the armatures of the two other magnets with respect to the said two other magnets.

7. A corrective set comprising two stationary alined opposing magnets, two other stationary alined opposing magnets having an alinement substantially at right angles to the alinement of the first magnets, an armature pivotally mounted at each magnet and individual adjustments for individually adjusting the angular positions of the different armatures with respect to the adjacent magnets.

8. A corrective set for a magnetic compass, comprising two stationary alined opposing magnets on opposite sides of the compass axis, a pivoted armature for one of the magnets and means for adjusting the angular position of the armature with respect to the magnets.

9. In a corrective set for a magnetic compass, two alined pairs of stationary opposing magnets located on opposite sides of the axis of the compass, a pivoted armature for one pair of the magnets pivoted between them and adapted with movement to vary the relative strength of the adjoining poles of this pair and means for turning the armature.

10. A corrective set comprising two alined pairs of stationary opposing magnets, two other alined pairs of stationary opposing magnets having an alinement substantially perpendicular to the alinement of the first two pairs, an armature pivotally mounted at one of the pairs, a second armature mounted at one of the adjoining pairs, means for adjusting the angular position of the first named armature with respect to the said one pair and separate means for adjusting the angular position of the second named armature with respect to the said adjoining pair.

11. A corrective set comprising individual alined opposing magnets spaced 90° apart about a circle, an armature mounted at each magnet, means for adjusting the relative position of one of the armatures whereby the armature directly opposite is automatically adjusted and means for angularly adjusting the relative position of the armature adjoining the first named armature whereby the armature directly opposite thereto is automatically adjusted, said angular adjustments being with respect to the magnets.

JOHN L. H. HAND.